US009967066B2

(12) United States Patent
Li et al.

(10) Patent No.: US 9,967,066 B2
(45) Date of Patent: May 8, 2018

(54) WIRELESS COMMUNICATION IN MULTI-RAT SYSTEM

(71) Applicant: FUJITSU LIMITED, Kawasaki-shi, Kanagawa (JP)

(72) Inventors: Zhaojun Li, Guildford (GB); Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/619,498

(22) Filed: Feb. 11, 2015

(65) Prior Publication Data
US 2015/0188681 A1 Jul. 2, 2015

Related U.S. Application Data

(63) Continuation of application No. PCT/EP2013/071772, filed on Oct. 17, 2013.

(30) Foreign Application Priority Data

Oct. 18, 2012 (EP) ..................... 12189066

(51) Int. Cl.
H04L 5/00 (2006.01)
H04W 72/08 (2009.01)
(Continued)

(52) U.S. Cl.
CPC ........... *H04L 5/0032* (2013.01); *H04W 24/08* (2013.01); *H04W 72/0426* (2013.01);
(Continued)

(58) Field of Classification Search
None
See application file for complete search history.

(56) References Cited

U.S. PATENT DOCUMENTS

2010/0130218 A1 5/2010 Zhang et al.
2010/0142487 A1 6/2010 Kim
(Continued)

FOREIGN PATENT DOCUMENTS

CN 10213862 A 7/2011
CN 102695290 A 9/2012
(Continued)

OTHER PUBLICATIONS

International Search Report dated Jan. 23, 2014 in corresponding international application PCT/EP2013/071772.
(Continued)

*Primary Examiner* — Kevin C Harper
*Assistant Examiner* — Derrick V Rose
(74) *Attorney, Agent, or Firm* — Staas & Halsey LLP

(57) ABSTRACT

A scheme for the co-ordination of multiple base stations of different RATs (radio access technologies), such as a LTE eNB, UMTS base station, and WiFi access point with the assistance of the terminals in order to achieve efficient radio resource scheduling for multi-RAT multi-flow aggregation in the downlink. At the network side, multi-RAT flows (RB11) share the same PDCP Entity, (PDCP Entity) while each has independent RLC/MAC (RAT1 RLC Entity, RAT2 RLC Entity). The terminal (UE1) performs necessary measurements on all involved RATs, depending on the requirements of different RATs, and sends measurement reports/indication to all involved base stations. Based on the measurement report as well as pre-defined rules/policy, a decision is made on which RAT should be used for next DL transmission or next period of DL transmission.

14 Claims, 6 Drawing Sheets

(51) Int. Cl.
*H04W 72/12* (2009.01)
*H04W 24/08* (2009.01)
*H04W 72/04* (2009.01)
H04W 88/10 (2009.01)
H04W 88/06 (2009.01)

(52) U.S. Cl.
CPC .......... *H04W 72/08* (2013.01); *H04W 72/12* (2013.01); *H04W 72/1231* (2013.01); *H04W 88/06* (2013.01); *H04W 88/10* (2013.01)

(56) References Cited

U.S. PATENT DOCUMENTS

| | | |
|---|---|---|
| 2010/0190488 A1 | 7/2010 | Jung et al. |
| 2011/0134831 A1* | 6/2011 | Pirskanen ............... H04L 5/001 370/328 |
| 2011/0212693 A1 | 9/2011 | Sågfors et al. |
| 2011/0268048 A1 | 11/2011 | Toskala et al. |
| 2011/0269453 A1 | 11/2011 | Ranta-Aho et al. |
| 2011/0275359 A1 | 11/2011 | Sebire et al. |
| 2011/0281578 A1 | 11/2011 | Narasimha et al. |
| 2011/0305193 A1 | 12/2011 | Grant et al. |
| 2011/0305220 A1 | 12/2011 | Lindoff et al. |
| 2012/0094608 A1 | 4/2012 | Shi et al. |
| 2012/0113859 A1 | 5/2012 | Jung et al. |
| 2012/0120821 A1 | 5/2012 | Kazmi et al. |
| 2012/0140743 A1* | 6/2012 | Pelletier ............ H04W 72/0453 370/335 |
| 2012/0178465 A1 | 7/2012 | Lin et al. |
| 2014/0056278 A1* | 2/2014 | Marinier ............. H04W 72/044 370/330 |

FOREIGN PATENT DOCUMENTS

| | | |
|---|---|---|
| EP | 2 426 987 A2 | 3/2012 |
| WO | WO 2010/059813 A1 | 5/2010 |
| WO | WO 2010/087625 A2 | 8/2010 |
| WO | WO 2011/046477 A1 | 4/2011 |
| WO | WO 2011/067459 A1 | 6/2011 |
| WO | WO 2011/082988 A1 | 7/2011 |
| WO | WO 2011/138236 A1 | 11/2011 |
| WO | WO 2011/138268 A1 | 11/2011 |
| WO | WO 2011/146293 A1 | 11/2011 |
| WO | WO 2011/154030 A2 | 12/2011 |
| WO | WO 2011/159215 A1 | 12/2011 |
| WO | WO 2011/159230 A1 | 12/2011 |
| WO | WO 2012/039656 A1 | 3/2012 |
| WO | WO 2012/064255 A1 | 5/2012 |
| WO | WO 2012/064772 A1 | 5/2012 |
| WO | WO 2012/074878 A2 | 6/2012 |
| WO | WO 2012/094983 A1 | 7/2012 |

OTHER PUBLICATIONS

European Search Report completed Mar. 7, 2013 in corresponding European application EP 12189066.9.
QUALCOMM Incorporated, "On Inter-site Multi-Point Transmission in HSDPA" 3GPP TSG RAN WG2 Meeting #75-BIS, Oct. 2011.
"Air Interface for Broadband Wireless Access Systems Amendment 1: Multihop Relay Specification" 2009 IEEE.
"Evolved Universal Terrestrial Radio Access (E-UTRA); Packet Data Convergence Protocol (PDCP) specification" ETSI TS 136 323 V8.6.0, 2009.
"Evolved Universal Terrestrial Radio Access (E-UTRA) and Evolved Universal Terrestrial Radio Access Network (E-UTRAN); Overall Description; Stage 2" ETSI TS 136 300 V8.12.0, 2010.
"Wireless LAN Medium Access Control (MAC) and Physical Layer (PHY) specifications" Amendment to IEEE Std. 802.11, 1999 Edition.
Jiang Bo: "Detailed Discussion on WCDMA Key Technique," Posts and Telecommunications Press, p. 89, May 31, 2008.
Chinese Office Action dated Aug. 31, 2017 in corresponding Chinese Patent Application No. 2013800053438.X.

* cited by examiner

| RAT1 ID | CSI for RAT1 | RAT2 ID |
|---|---|---|
| CSI for RAT2 | RAT3 ID | CSI for RAT3 |

WIRELESS COMMUNICATION IN MULTI-RAT SYSTEM

CROSS-REFERENCE TO RELATED APPLICATIONS

This application is a continuation application of International Application PCT/EP2013/071772, filed on Oct. 17, 2013 and claims the benefit of European Application No. 12189066.9, filed Oct. 18, 2012, in the European Intellectual Property Office, the disclosure of which is incorporated herein by reference.

FIELD OF THE INVENTION

This invention generally relates to a wireless communication system and in particular, to a method of receiving data at a terminal simultaneously using multiple base stations.

BACKGROUND OF THE INVENTION

Wireless communication systems are widely known in which a terminal, subscriber station or user equipment (henceforth referred to as a UE for convenience) communicates wirelessly with a base station (or access point) by use of a certain radio access technology (RAT). Examples of such a RAT include the 3GPP family of standards including GSM, GPRS, UMTS and LTE, as well as WiMAX (IEEE802.16), CDMA and Wi-Fi (IEEE802.11).

Although conventionally, a UE employs only one RAT at a time for its communication, UEs such as smartphones are increasingly capable of supporting more than one RAT simultaneously and moreover, several radio access networks (RANs) employing various RATs may be available in the same place, offering the possibility of multi-RAT communication to increase the overall bandwidth available to the UE. Since each RAT available in a given area may have its own base station, this implies that the UE is able to send or receive data to and from multiple base stations (and thus via multiple cells, in the case of cellular systems such as 3GPP or WiMAX) simultaneously.

Henceforth, for convenience, the term "RAT" is also used to denote a wireless communication system employing a specific RAT. Thus, "multi-RAT communication" means communication via a plurality of wireless communication systems which involve the use of a plurality of different RATs. The term "network" is used henceforth to denote the totality of all such wireless communication systems within a given geographical area, except as demanded otherwise by the context.

Similar technologies where the base stations belong to the same RAT (Radio Access Technology), such as Carrier Aggregation (CA) or Cooperative Multi-point operation (CoMP), have been introduced into 3GPP since LTE release 10. In CA two or more Component Carriers (CCs) at different frequencies are aggregated in order to support wider transmission bandwidths up to 100 MHz. A UE may simultaneously receive or transmit on one or multiple CCs depending on its capabilities. In CoMP the cooperating base stations operate at the same carrier frequency. Details of CA and CoMP as applied to LTE are given in the 3GPP standard TS36.300, hereby incorporated by reference.

Where the base stations support different RATs, the co-operation becomes more difficult. Before discussing the problems involved, it may be helpful to outline the protocol layers involved in a wireless communication system, taking LTE as an example.

As is well known, current wireless communication systems are constructed by dividing the tasks to be performed among a plurality of layered protocols, each node or entity in the system being equipped to process data at various layers (or levels within a layer) in a protocol stack, with the protocols at corresponding layers notionally communicating with each other. Although ultimately all signalling in the system is carried by the lowest, physical layer, this hierarchical arrangement allows each layer to be considered independently.

FIG. 1 shows a protocol stack in each of three main types of nodes in an LTE-based wireless communication system. These nodes are the UE 10 (subscriber station such as a mobile handset), an eNodeB 12 (the base station in an LTE system, also called eNB), and a Mobility Management Entity or MME 16 (a higher-level node for controlling mobility of UEs, in other words handovers between eNodeBs, and for setting up "bearers" as discussed below). As shown in FIG. 1, apart from non-access stratum (NAS) protocols, all the protocols terminate in the eNodeB 12 on the network side.

The horizontal bands in the Figure represent individual protocols within the protocol stack of each node in the system, and each protocol is part of a particular protocol layer within the well-known OSI model. With respect to a given node, each protocol can be considered to reside in a functional module or "entity" which can be considered separately from protocols in other layers. This allows, among other things, for the use of the concept of "radio bearers", which provide a kind of tunnel between peer entities in the base station and UE at a given protocol level for user data or control signalling. Radio bearers are associated with "logical channels" which link SAPs (Service Access Points) for peer-to-peer communication between the MAC and RLC protocol layers discussed below.

Packets belonging to the same radio bearer get the same end-to-end treatment in the network. There are two main bearer types, Guaranteed Bit Rate (GBR) and non-GBR. For GBR bearers, the network guarantees a certain bit rate to be available for the bearer at any time. The bearers, both GBR and non-GBR are further characterized by a Maximum Bit Rate (MBR), which limits the maximum rate that the network will provide for the given bearer. In this way it is possible for each radio bearer to provide a certain quality of service, QoS. For each radio bearer, which exists between the UE 10 and the eNodeB 12, there is a corresponding access bearer between the eNodeB and a Packet Data Network Gateway, PDN GW (not shown).

FIG. 2 is a slightly less conceptual view than FIG. 1, showing the protocol stack for one node and concentrating on the downlink (that is, the direction of transmission from the network to the UE). FIG. 2 illustrates how packets are exchanged between protocols at different layers, and shows the effect of Radio Resource Control, RRC on managing various protocols. The protocol stack in FIG. 2 is for handling user traffic (such as data being downloaded) and is referred to as the "user plane", as distinct from the "control plane" used to carry network signalling.

As indicated in FIGS. 1 and 2, there is a physical layer protocol PHY at the lowest level, Layer 1, responsible for actual wireless transmission of data over the air, using the frequency band(s) of the RAT in use, and employing the transmission scheme of that RAT; for example, in the case of the downlink in LTE, this is orthogonal frequency division multiplexing (OFDM). In LTE, the unit of data transfer in the PHY is the Transport Block (TB). The received TBs are passed from the PHY layer to the next-higher layer (MAC) once per Transmission Time Interval (TTI) of 1 ms. Scheduling can be performed in units of 1 TTI or more, in other words on a timescale as short as 1 ms.

Thus, in the case of the downlink, radio signals at the PHY level arrive at the receiver and processed/decoded to reconstruct the transport blocks and recover data packets, which then are processed in successively-higher levels in the protocol stack. Incidentally, within each protocol the packets are referred to as "protocol data units" (PDUs) and the PDUs of one level in the stack form so-called Service Data Units (SDUs) of the next stage, possibly after concatenation or segmentation. Each TB from the PHY corresponds to a MAC PDU.

Above the PHY there are the layer-2 protocols MAC, RLC and PDCP.

MAC stands for Media Access Control and is responsible for managing the so-called hybrid ARQ function (see below), and for extracting different logical channels out of the transport block for the higher layers. Format selection and measurements provide information about the network that is needed for managing the entire network.

Logical channels exist at the top of the MAC. They represent data transfer services offered by the MAC and are defined by what type of information they carry. Types of logical channels include control channels (for control plane data) and traffic channels (for user plane data). Transport channels are in the transport blocks at the bottom of the MAC. They represent data transfer services offered by the PHY and are defined by how the information is carried, different physical layer modulations and the way they are encoded.

The Hybrid Automatic Repeat-request (HARQ) process, done in combination between the MAC and the PHY, allows retransmission of transport blocks for error recovery. The retransmission is performed by the PHY, and the MAC performs the management and signalling. The MAC indicates a NACK when there's a transport block CRC failure; the PHY usually indicates that failure. Retransmission is done by the eNodeB or the sender on the downlink using a different type of coding. The coding is sent and maintained in buffers in the eNodeB. Eventually, after one or two attempts, there will be enough data to reconstruct the transport blocks.

The MAC layer provides RLC PDUs to the next layer-2 protocol, RLC. RLC stands for Radio Link Control, and performs segmentation and reassembly and operates in three modes: transparent mode (TM), acknowledged mode (AM) and unacknowledged mode (UM). These are used by different radio bearers for different purposes. The RLC provides in-sequence delivery and duplicate detection.

Other wireless communication systems such as UMTS and WiMAX also employ RLC. Although Wi-Fi (IEEE802.11) does not employ a RLC protocol as such, the logical link control (LLC) layer in Wi-Fi has a similar role.

The next protocol in the stack above RLC, still within layer-2 of the OSI model, is PDCP. PDCP stands for Packet Data Control Protocol and, being of particular interest for present purposes, is described in some detail. Further details can be found in 3GPP standard TS 36.323, hereby also incorporated by reference.

ROHC referred to below stands for Robust Header Compression and refers to a technique used to reduce the header size of packets in LTE. Since LTE is completely Internet Protocol (IP)-based, voice calls have to be carried as IP packets using Voice over IP (VoIP) and without some measure to reduce the header size, this would be inefficient.

PDCP functions in the user plane include decryption, ROHC header decompression, sequence numbering and duplicate removal. PDCP functions in the control plane include decryption, integrity protection, sequence numbering and duplicate removal. There is one PDCP entity (in other words, PDCP instance) per radio bearer. Therefore, different PDCP entities exist which are associated with either the control plane or the user plane depending on the type of bearer.

FIG. 3, taken from the above mentioned TS36.323, is a functional view of the PDCP layer. In this Figure, u-plane denotes the user plane and c-plane, the control plane. The left-hand portion of the Figure show functional blocks involved on the uplink and the right-hand side shows the functions performed on the downlink.

As shown in FIG. 3, the PDCP layer is responsible for various tasks including:

Sequence numbering, which allows in-order delivery of packets, and duplicate detection: if the PDCP layer receives packets with the same sequence number, then it discards duplicates and does not send them to upper layers Header compression and decompression for user plane data Integrity protection and verification for control plane data (however, there is no integrity protection offered to the user plane data)

Ciphering and Deciphering of user plane and control plane data

Addition/removal of a PDCP Header (not shown) Security and Handover functions.

There is one to one correspondence between a PDCP SDU and a PDCP PDU. That is, there is no segmentation or concatenation in the PDCP layer. Addition of a PDCP header, applying compression and security on the PDCP SDU makes a PDCP PDU. Similarly deciphering, decompression and removal of the PDCP header makes a PDCP SDU from a PDCP PDU.

In LTE, the above mentioned radio bearers (RBs) are defined at various protocol levels including PDCP. There are two kinds of PDCP bearers: SRB (Signalling Radio Bearer) and DRB (Dedicated Radio Bearer). There are only two SRBs—SRB1 and SRB2. These are used by control plane protocol to send the packets to the UE. DRBs are used for sending voice and data, and as many DRBs are set up as the number of services or QoS streams required by the terminal. When a DRB is set up, a Logical Channel Identity (LCID) will be assigned to this DRB for UL and DL. In this sense, it may be said that one logical channel (LC) conventionally corresponds to one RB. For the purpose of resource allocation, the logical channels may in turn be assigned to Logical Channel Groups (LCGs). Conventionally, a given LCID or LCG can be associated with only one RAT.

Layer 3 protocols in the UE include RRC or Radio Resource Control, which is responsible for connection management, bearer control, and handovers to other base stations, UE measurement reporting, and QoS management.

Finally NAS stands for Non-Access Stratum which forms the highest-level of communication between the UE 10 and MME 16. The layers under the NAS are also referred to as the Access Stratum (AS) since they concern the radio access network which terminates at the eNodeB. NAS protocols support the mobility of the UE and the session management procedures to establish and maintain IP connectivity between the UE and a packet data network gateway, PDN GW. They define the rules for a mapping between parameters during inter-system mobility with 3G networks or non-3GPP access networks.

Returning now to the scenario of CA within LTE, the typical Layer 2 structures for downlink and uplink with CA configured in LTE networks are illustrated in FIGS. 4 and 5 respectively. As is apparent from these Figures, the multi-carrier nature of the physical layer is only exposed to the MAC layer for which one HARQ entity is required per serving cell. In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell.

When CA is configured, the UE only has one RRC connection with the network. At RRC connection establishment/re-establishment/handover, one serving cell provides the NAS mobility information (e.g. Tracking Area Identity, TAI), and at RRC connection re-establishment/handover, one serving cell provides the security input. This cell is referred to as the Primary Cell (PCell). Generally, one carrier corresponds to one cell. In the downlink, the carrier corresponding to the PCell is the Downlink Primary Component Carrier (DL PCC) while in the uplink it is the Uplink Primary Component Carrier (UL PCC).

However, the above discussion relates to a single RAT (namely, LTE). The problem addressed by this invention is in a wireless communication system where multiple radio access technologies (e.g. GSM, UMTS, LTE and beyond, WiMAX, WiFi, etc.) are available in the whole network or in certain areas, such as city centres (either full time, or during peak hours only).

For simplicity, LTE and WiFi will be used as an example of multiple RATs co-existing in a wireless communication system. FIGS. 6(A) and 6(B) illustrate two examples of typical deployment scenarios in such system; in case (A), the LTE eNB and WiFi AP are separated (in other words provided by different pieces of equipment), while in case (B) the LTE eNB and WiFi AP are co-located, in other words a single unit acts as a combined LTE base station and Wi-Fi access point. In both cases, the UEs are assumed to be dual (or more) mode devices having a WiFi interface. It is further assumed that there is some form of backhaul network (such as broadband Internet) connecting both the eNB and AP to a core network.

Based on the current 3GPP standard as set out in TS36.300, the eNB in an LTE system is responsible for managing resource scheduling for both uplink and downlink channels. In order to utilise the shared channel resources (by multiple UEs) efficiently, a scheduling function is used in the MAC layer. The MAC entity in the eNB includes dynamic resource schedulers that allocate physical layer resources for the DL-SCH and UL-SCH transport channels. Different schedulers operate for the DL-SCH and UL-SCH. The scheduler should take account of the traffic volume and the QoS requirements of each UE and associated radio bearers, when sharing resources between UEs. Schedulers may assign resources taking account the radio conditions at the UE identified through measurements made at the eNB and/or reported by the UE. Radio resource allocations can be valid for one or multiple TTIs.

When CA is configured, a UE may be scheduled over multiple serving cells simultaneously. However, in multi-RAT scenarios, resource scheduling becomes very challenging; especially for the case of FIG. 6(A) where LTE eNB and WiFi AP are separated, and backhaul support cannot be assumed to be ideal for the information exchange between the multi-RAT nodes. The key issue in such scenarios is how to co-ordinate the radio resource scheduling in multiple nodes of different RATs in order to achieve efficient multi-flow aggregation. This is an issue in both UL and DL; however the present invention is mainly concerned with the downlink.

SUMMARY OF THE INVENTION

According to a first aspect of the present invention, there is provided a multi-RAT wireless communication system comprising:
a terminal;
first base station means for wirelessly communicating with the terminal via a first RAT; and
second base station means for wirelessly communicating with the terminal via a second RAT;
the first and second RATs each having an upper protocol layer and a lower protocol layer associated with the upper layer;
the first and second base station means maintaining entities for configuring one or more radio bearers for wireless communication with the terminal; and
wherein the one or more radio bearers are carried by both the first and second RATs, the radio bearer being configured in the first and second base station means with the same upper protocol layer entity for the first and second RATs, and with different lower protocol layer entities for the first and second RATs.

Here, "RAT" means radio access technology such as GSM, GPRS, UMTS and LTE, as well as WiMAX (IEEE802.16), CDMA and Wi-Fi (IEEE802.11). Where required by the context, RAT means a wireless communication system employing the RAT for its operation. Preferably, one of the RATs is LTE.

The "system" means the combined network formed by all the wireless communication systems available to the terminal.

The "terminal" includes any kind of subscriber station, user equipment or other wireless device of a user, whether mobile or fixed, and can also extend to a relay station. Of course, in a practical system there are usually a plurality of terminals arranged to communicate with the first and second base station means. In this case the base station means maintains, for each terminal respectively, a same upper protocol layer entity for the first and second RATs, and different lower protocol layer entities for the first and second RATs.

The term "radio bearer", apart from its specific meaning in the context of LTE, can be regarded as referring to a service provided by the access stratum of a RAT to the non access stratum (core network) for delivering data between a terminal and the core network. In a preferred embodiment, one radio bearer is configured to be carried on both the first and second RATs.

The term "base station means" refers to a functional unit, not necessarily independently provided from another base station means, which provides base station functionality with respect to a given RAT. Here, and in the description, "base station" refers to a radio access node from which the terminal receives transmissions, and which in the case of a cellular system provides one or more cells. The term "access point" used in Wi-Fi is also included within the scope of "base station" for present purposes. Thus, a single unit may for example provide first base station means in the form of an LTE eNB and second base station means in the form of a Wi-Fi access point.

The base station means may define entities at each protocol layer, in which case the first and second base station means may maintain entities at each of the upper and lower protocol layers. However, a one-to-one correspondence between protocol layers and entities maintained in the base station means is not essential.

Preferably the upper protocol layer is a Packet Data Control Protocol, PDCP layer or a protocol layer corresponding thereto; and the lower protocol layer is a Radio Link Control, RLC and/or a Medium Access Control, MAC protocol layer or a protocol layer corresponding thereto.

In one form of the invention (see FIG. 6(B)), the first and second base station means are provided by a single multi-RAT base station in which are provided a single upper protocol layer entity per terminal for both RATs and one or more different lower protocol layer entities per terminal for each RAT.

In another form of the invention (FIG. 6(A)), the first and second base station means are constituted by physically separated base stations, in each of which are provided a single upper protocol layer entity for both RATs and one or more different lower protocol layer entities for each RAT, correspondence between the respective entities in each base station being maintained by mutual communication via a communications link between the base stations.

In the latter case, and when there is a single said radio bearer, one of the base stations is selected as a primary base station which is responsible for management of the radio bearer and for forwarding information to the other base station.

When the first and second base station means are constituted by physically separated base stations these may be mutually connected via a communications link to a central node, and in each of the base stations there may be provided a single upper protocol layer entity for both RATs and one or more different lower protocol layer entities for each RAT, correspondence between the respective entities in each base station being maintained by control of the central node.

In any system as defined above, the or each radio bearer may be applicable to both a downlink and an uplink, in which case lower protocol layer entities are defined in each RAT for each of the uplink and downlink.

The one or more radio bearers may include a data bearer for serving the terminal with a given quality of service.

As well as the one or more radio bearers mentioned above, one of the first and second base station means may configure an additional radio bearer as a signalling bearer carried by only one of the RATs.

In any system as defined above, it is possible that uplink communication from the terminal is carried by only one of the RATs.

In any of the above systems, preferably, the terminal is arranged to perform a measurement on a wireless communications link in at least one RAT and to send a measurement report via at least one RAT. Such a measurement report, in accordance with an embodiment of the present invention, contains information for more than one RAT. The measurement report may contain an indication of a RAT preferred by the terminal for wireless communication to and/or from the terminal.

According to a second aspect of the present invention, there is provided a method of operating the wireless communication system according to any preceding claim.

According to a third aspect of the present invention, there is provided base station equipment for use in a multi-RAT wireless communication system and providing at least one of first base station means for wirelessly communicating with a terminal via a first RAT and second base station means for wirelessly communicating with the terminal via a second RAT, the first and second RATs each defining an upper protocol layer and a lower protocol layer associated with the upper layer;
  wherein said base station equipment is arranged to maintain entities for configuring one or more radio bearers to be carried by both the first and second RATs for wireless communication with the terminal; and
  the base station equipment being arranged to maintain a single upper protocol layer entity per terminal for the first and second RATs, and different lower protocol layer entities per terminal for the first and second RATs.

A further aspect provides a multi-RAT wireless communication method comprising:
  wirelessly communicating with a terminal on at least a downlink via a first RAT and simultaneously via a second RAT, the first and second RATs each having an upper protocol layer and a lower protocol layer associated with the upper layer;
  maintaining entities at each of the upper and lower protocol layers for configuring a radio bearer for wireless communication with the terminal, the entities including the same upper protocol layer entity for the first and second RATs and different lower protocol layer entities for the first and second RATs; and
  scheduling resources for the radio bearer using both the first and second RATs.

In another aspect, the present invention relates to a computer program (which may be stored to a computer-readable medium) comprising program code for causing a computer to carry out a method as described in the present application or to operate as a terminal as described in the present application or a base station means as described in the present application.

Thus, the present invention enables the co-ordination of multiple base stations of different RATs (e.g. LTE eNB, UMTS base station, WiFi access point, etc.) with the assistance of the terminals (UEs in 3GPP terminology) in order to achieve efficient radio resource scheduling for multi-RAT multi-flow aggregation in the downlink. At the network side, multi-RAT flows share the same PDCP Entity (either by sharing a common PDCP Entity, or by maintaining identical copies of a PDCP Entity), while each has independent RLC/MAC. The terminal performs necessary measurements on all involved RATs (depending on the requirements of different RATs) and sends measurement reports/indication to all involved base stations. Based on the measurement report as well as pre-defined rules/policy, the decision will be made on which RAT should be used for next DL transmission or next period of DL transmission.

Working at the PDCP layer in accordance with the present invention provides greater flexibility for multi-RAT aggregation, in comparison with other possible approaches such as providing aggregation at the MAC level.

BRIEF DESCRIPTION OF THE DRAWINGS

Preferred embodiments of the present application are described, by way of example, with reference to the accompanying drawings in which.

DETAILED DESCRIPTION

Before describing specific embodiments, the principle of the invention will be outlined. Briefly, embodiments of the present invention provide a scheme which enables the co-ordination of multiple base stations of different RATs (e.g. LTE eNB, UMTS base station, WiFi access point, etc.) with the assistance of the UEs in order to achieve efficient radio resource scheduling for multi-RAT multi-flow aggregation in the downlink. Embodiments of the present invention are principally aimed at the user plane (data traffic). In practice, it is likely that control plane traffic is carried over the more capable/more reliable RAT among those available, e.g. LTE.

In this scheme, multiple cells of different RATs can simultaneously schedule transport block(s) to a single UE. (For simplicity, it can be assumed that each RAT provides one cell, but it would be possible for a UE to communicate via more than one cell simultaneously using the same RAT). The conventional approach would be that for simultaneous use different RATs are using different frequencies. However, this does not rule out the possibility that they could use the same frequencies, for example at different times in the same frame, or even at the same time.

If the same data is sent via multiple RATs this provides diversity. If the data is different, then this can provide higher data rates. The different cells can belong to the same base station (where multiple RATs are co-located in the same node as in FIG. 6(B)), or belong to non co-located base stations of different RATs (FIG. 6(A)). The supported RATs can be 3GPP radio access technologies, such as GSM, GPRS, UMTS, LTE and beyond; or non-3GPP radio access technologies, such as WiMAX, CDMA, WiFi, etc.

Figure 1:
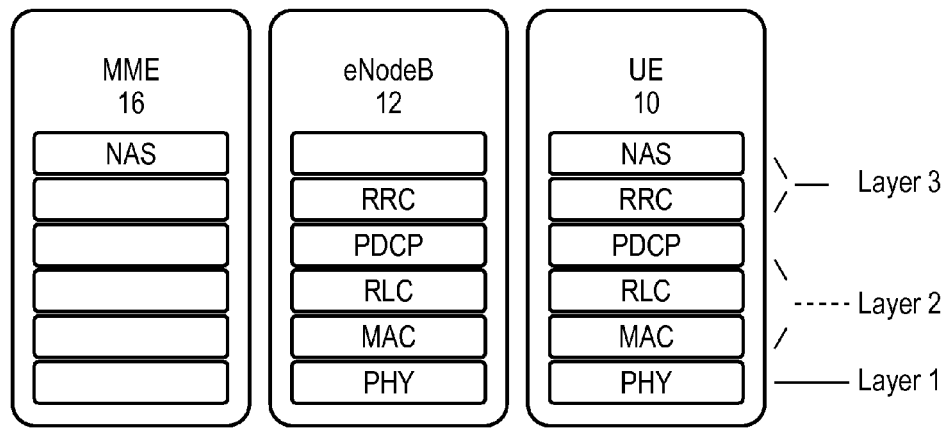
—
  FIG. 1 shows a protocol stack employed in a 3GPP wireless communication system.
Figure 2:
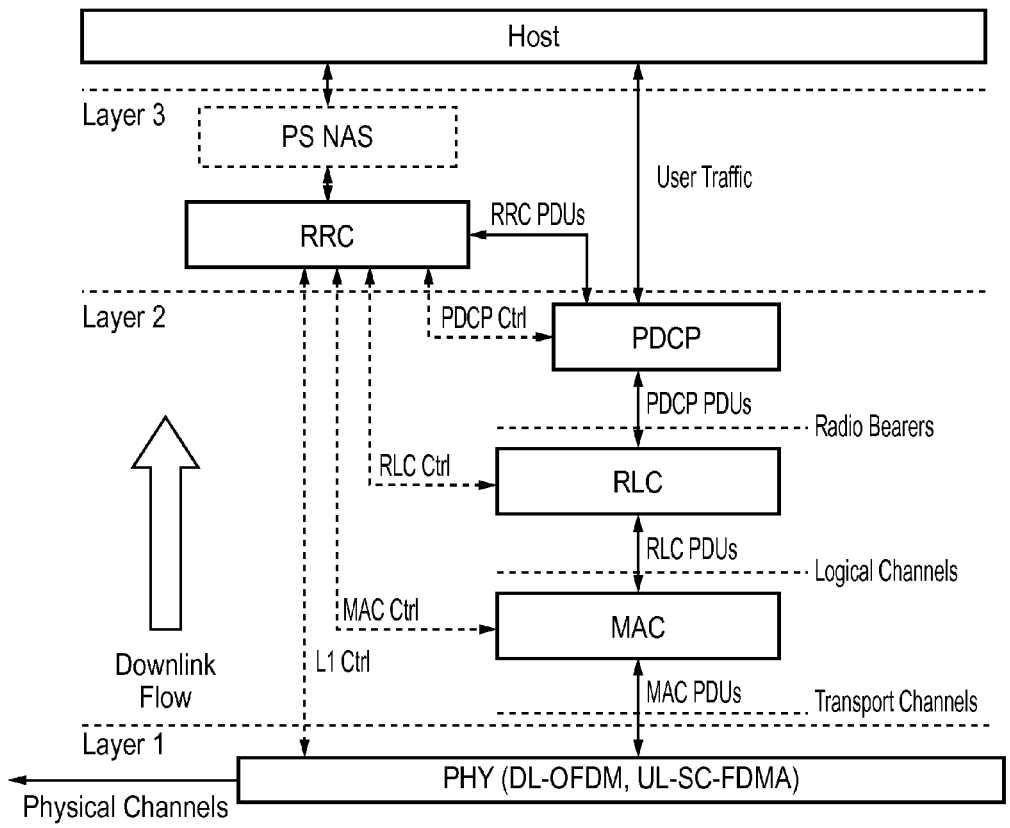
FIG. 2 illustrates a downlink flow of packets between the protocol layers in FIG. 1.
Figure 3:
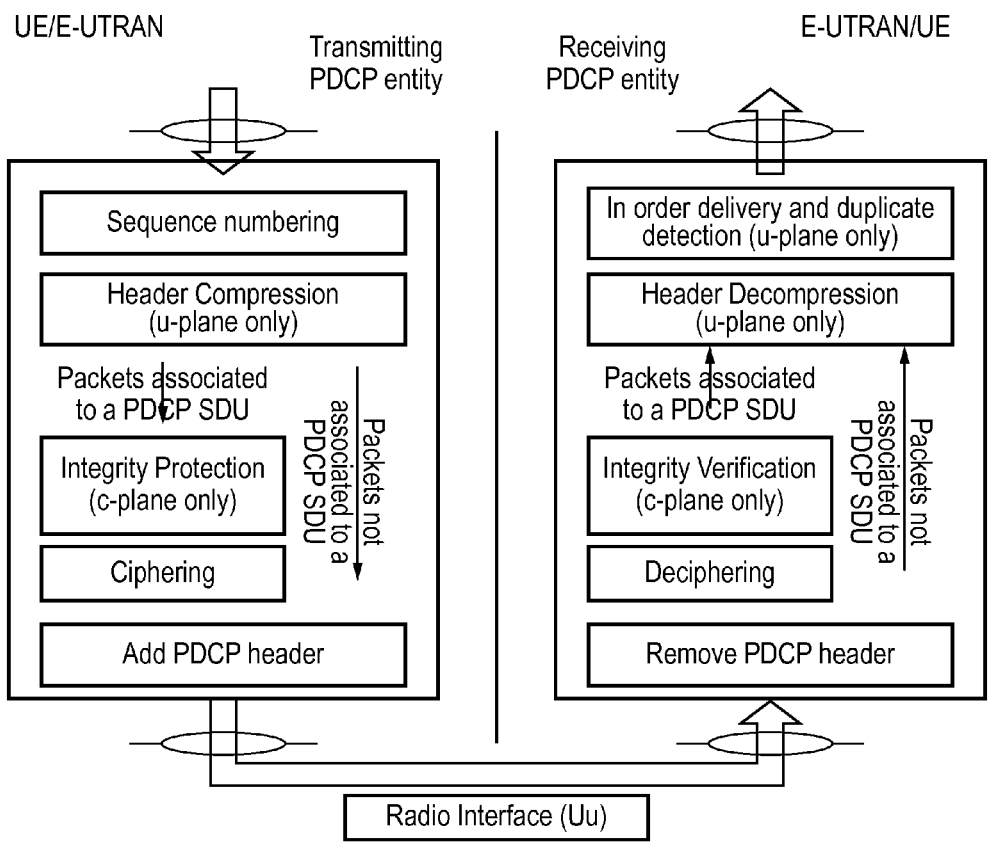
FIG. 3 shows the functions of a PDCP entity in the PDCP protocol layer.
Figure 4:
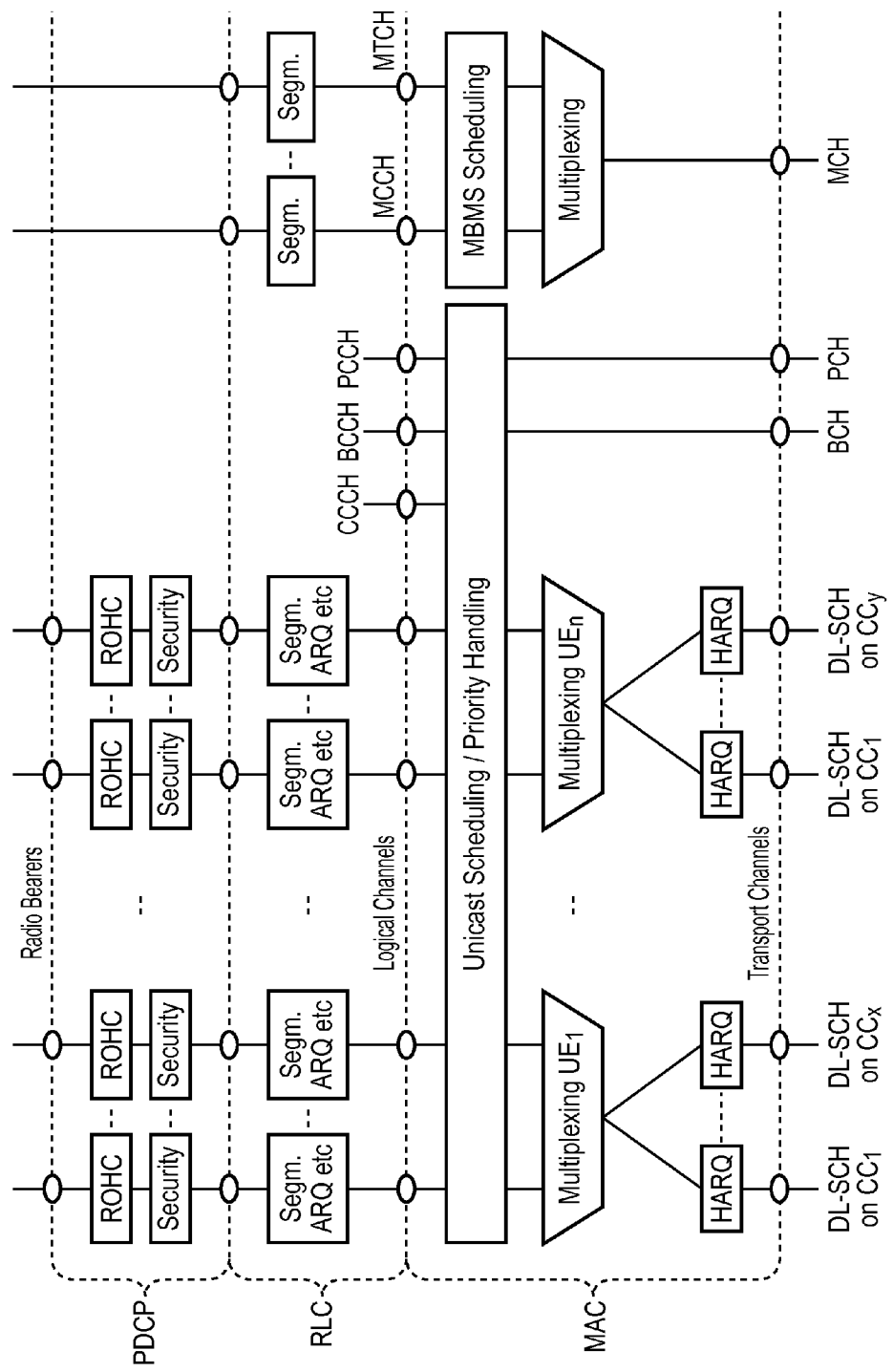
FIG. 4 illustrates the Layer 2 structure for the downlink of a wireless communication system configured for carrier aggregation (CA)
Figure 5:
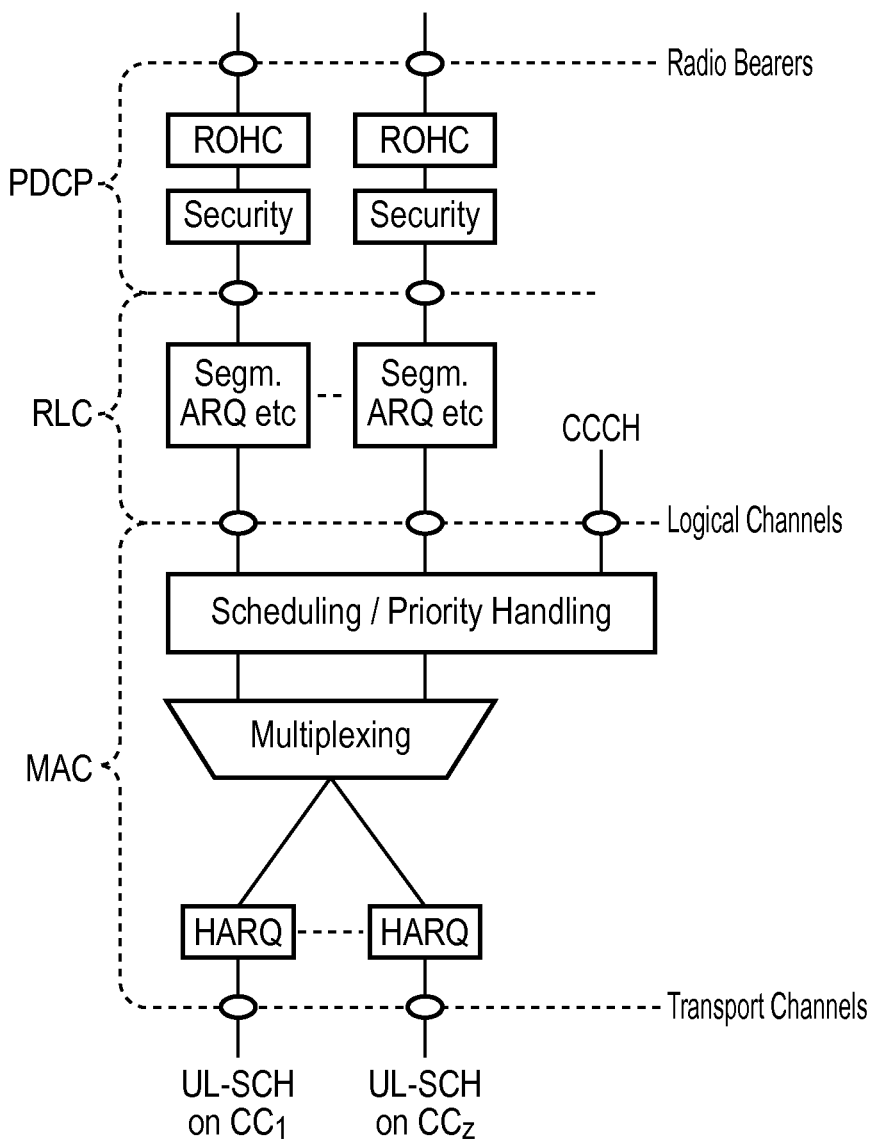
FIG. 5 illustrates the Layer 2 structure for the uplink of a wireless communication system configured for carrier aggregation (CA)
Figures 6A, 6B:
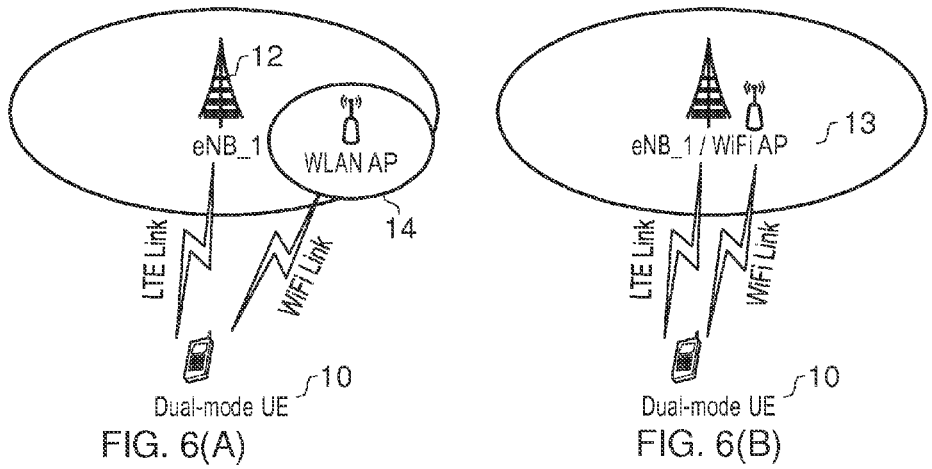
FIGS. 6(A) and (B) show two example deployment scenarios in a multi-RAT system (LTE and WiFi)
Figure 7:
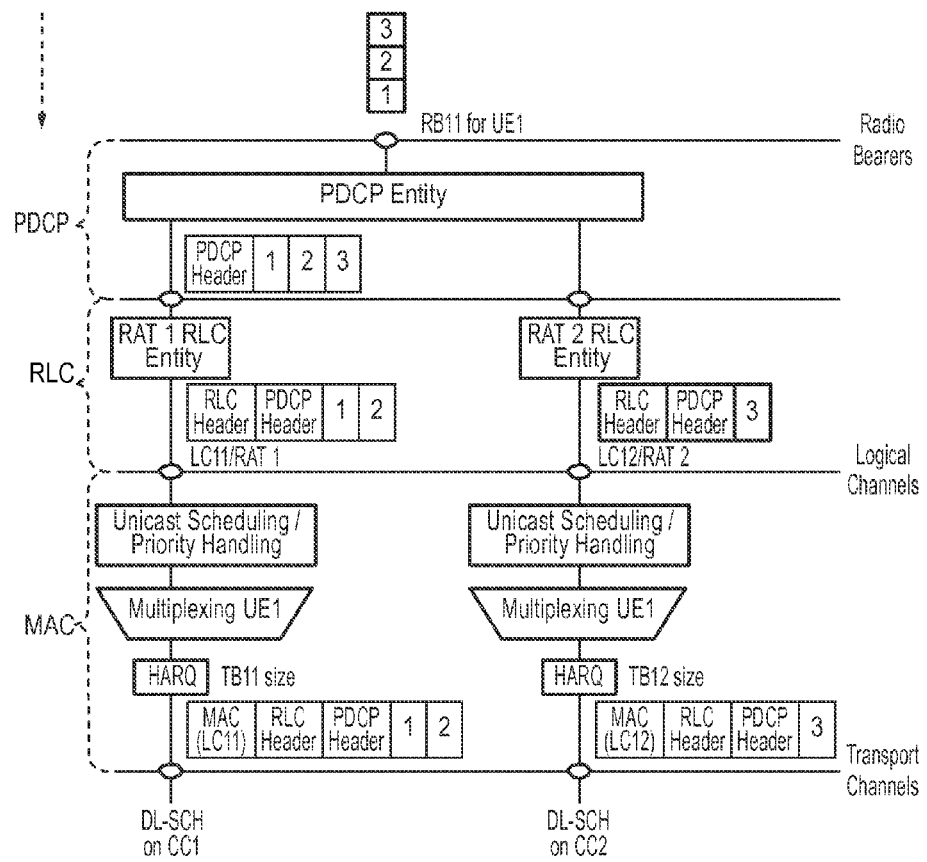
FIG. 7 shows an example of the Layer 2 Structure for the downlink of a multi-RAT system in accordance with the present invention.

On the network side, multi-RAT flows (possibly virtually) share the same PDCP Entity, while each has independent RLC/MAC, as displayed in FIG. 7. In FIG. 7, the numbered boxes "1", "2", "3" represent downlink application layer packets. Each vertical branch in the Figure corresponds to a different RAT and (in the case of FIG. 6(A)) would be handled by a different base station for each branch. Another implementation option could be one in which the controlling base station, for example LTE eNB, maintains the full picture of the multi-RAT multi-flow aggregation in order to guarantee the required QoS.

The box labelled "HARQ" in the MAC layer represents the HARQ entity mentioned earlier. PDCP Entity and RLC Entity/RLC Entities are associated with one radio bearer, while MAC is shared by all radio bearers. The HARQ Entity is associated with one CC in case of CA. There is not necessarily a HARQ entity in every RAT (for example WiFi does not employ HARQ).

Incidentally, "PDCP Entity" is a 3GPP term, which may not have a recognised meaning in other networks (such as WiFi and WiMAX). However, similar functions may be carried out by different entities in other systems (or perhaps not carried out at all). Thus, non-3GPP RATs may need to adopt a simple PDCP function.

In the case where multiple RAT base stations are co-located in the same node, e.g. FIG. 6(B), the base station maintains one single PDCP Entity for a radio bearer allocated for the UE's one specific application with certain QoS requirements. This PDCP Entity is then associated with multiple sets of RLC Entities; one RAT has one set of RLC Entities. The "set" of RLC entities means one or two (one for each direction) RLC entities depending on the RB characteristic (i.e. unidirectional or bi-directional) and RLC mode (TM, AM or UM). There are as many sets of RLC entities as the number of RATs (or at least the number of RATs for which it is meaningful to refer to RLC or RLC-like function).

Although "RLC Entity" is a 3GPP term, there may be similar functionality in other non-3GPP networks. For example, the LLC (logical link control) layer in WiFi systems has similar function although much simpler than RLC in 3GPP networks.

In the case of multiple RATs for which the respective base stations are separated, e.g. FIG. 6(A), each base station maintains a layer-2 structure as shown in FIG. 7. Then, when a radio bearer is set up for the UE's one specific application with certain QoS requirements, two cells of different RATs are assigned as serving cells. The base stations of both cells need to exchange information so that both base stations can maintain one shared single PDCP Entity for this radio bearer. In each base station, the PDCP Entity is then associated with the RLC Entities of its own cell, as well as virtual RLC Entities of another cell, as illustrated in FIG. 7.

In FIG. 7, the numbered boxes "1", "2" and "3" represent DL data packets. The PDCP Entities in different base stations are identical (FIG. 7 shows the PDCP Entity of one base station), and are associated with a single radio bearer RB11. This PDCP is then associated with multiple sets of RLC Entities, one of which ("RAT1 RLC Entity") represents the RLC module within this base station, and the others of which—only one other in this example ("RAT2 RLC Entity")—are virtual ones that represent the corresponding RLC modules of other base stations. Note, for simplicity, it is assumed in this example shown in FIG. 7 both RAT1 and RAT2 use a similar RLC/MAC structure. In practice, this is not necessarily the case; and different RATs may use their own RLC or RLC like structure and MAC layer implementation.

On the terminal side, UE performs necessary measurements on all involved RATs (depending on the requirements of different RATs) and sends measurement reports/indications to all involved base stations, not necessarily individually. (That is, a combined report may be sent, and received by at least one base station with forwarding of relevant information to other base stations). Based on the measurement report as well as any pre-defined rules/policy in the network, the decision will be made on which RAT (or RATs)

should be used for the next DL transmission or next period of DL transmission. Generally the same RAT will handle the re-transmission if required.

Thus, different RATs share a single PDCP Entity for the given radio bearer of a given UE. One of the main functions of PDCP is to convert the downlink application layer packets into PDCP protocol PDUs, and to assign a PDCP SN (sequence number) to each PDU. One example of defining/deciding "transmission period" between involved base stations could be based on PDCP SNs, which requires information exchange regarding PDCP SNs between base stations. It is noted that not every RAT will necessarily employ the same time periods such as frames, for their operation. However, different frame lengths at the physical layer may not be an issue at higher layers, which may not need to conform to a particular frame timing.

Embodiments of the present invention will now be described. In general, unless otherwise stated, the embodiments are based on LTE and beyond, co-existing with other radio access technologies. The term "network" is used henceforth to mean the combined wireless communication systems available in a given geographical area, comprising one or more LTE eNodeBs together with other base stations or access points of other RATs, each controlling more than one cell. Each cell may serve one or more terminals (UEs) which may receive and decode signals transmitted in that cell. In order to schedule the appropriate use of transmission resources in time, frequency and spatial domains for transmission to and from the UEs, the network sends control signalling to the UEs. In LTE, the scheduling of data transmissions is based on channel state information (CSI) reported by the UEs. The CSI is determined by the UE monitoring CSI reference signals (CSI-RS) transmitted periodically by the antenna ports supporting the cell. The details of CSI-RS transmission (e.g. number of ports, locations of CSI-RS signals, periodicity of transmission) are configured by RRC signalling.

Radio Bearer Management

A radio bearer (RB) is allocated for the UE's one specific application with certain QoS requirements. In the present invention, at least one common RB is used for all the RATs that are assigned as serving cells for multi-RAT multi-flow aggregation for this radio bearer. "Radio bearer" is primarily a 3GPP term, which is often associated with certain QoS requirements.

Incidentally, more than one RB may be set up to provide the application: for example, to service a multimedia application one RB for video and another for audio. Another example is scalable video where a base layer is sent over one RB and enhancement layers over other RB(s) of other, possibly less reliable, RATs; each of these RBs may be supported by one RAT or multiple RATs.

There may need to be a mapping between the parameters describing the common radio bearer and the particular concepts used in a given RAT.

Figures 8, 9:
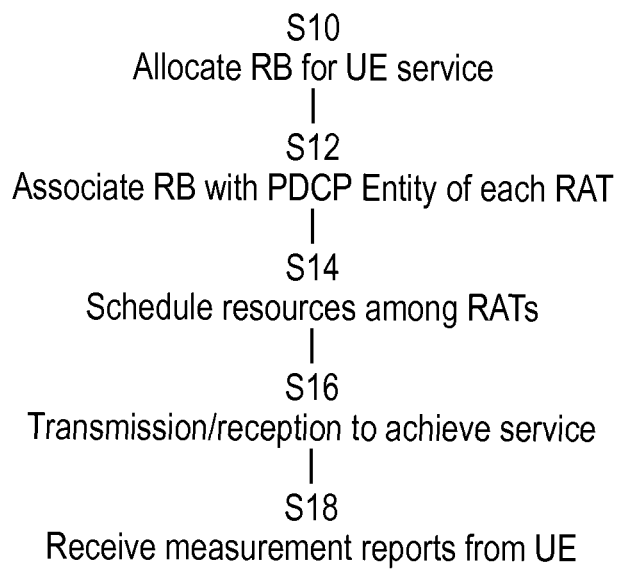
FIG. 8 is a flowchart of steps in a method of the invention from the viewpoint of base stations of the multi-RAT system.
FIG. 9 illustrates a possible format of a combined CSI report from a UE in one embodiment of the present invention.

FIG. 8 is a simplified flowchart of the steps involved.

For a UE configured with multi-RAT multi-flow aggregation, when a radio bearer is allocated for the UE's service with certain QoS requirements (step S10), the network (i.e. the base stations of the involved RATs) needs to associate this radio bearer with the PDCP Entity maintained in each base station (step S12). Note all the PDCP Entities in the involved RATs are identical, which can be achieved (in the case of FIG. 6(A), where the base stations of multiple RATs are separated) by OAM pre-configuration and in-frequent information exchange between base stations to update PDCP status. In the case of FIG. 6(B) it is sufficient to provide one common PDCP entity used by each of the involved RATs.

Then (S14) the base stations need to co-operate to determine an appropriate resource allocation among the available RATs to provide the QoS demanded by the service. To achieve this, network information exchange is required among involved RATs (in the case that the base stations of multiple RATs are separated), which include the basic configuration of the radio bearer/PDCP Entity, the policy/rules of how to schedule the data transmission among the involved base station. For example, the selection of the RATs may take into account of different functions of application packets; e.g. application level control messages may be carried over one RAT while data messages are transmitted via another RAT. One example of application layer control signalling could be SIP (session initiation protocol) signalling; this is control signalling in the 3GPP IMS IP Multimedia Subsystem, but is treated as user data in 3GPP. Another example is real-time multi-media data traffic in 3GPP, which is treated as user data, but actually includes both RTP user data packets and RTCP control packets. Another more common example is the distinction between IP data packets and Internet Control Message Protocol, ICMP control packets.

Another principle which may be used for selection of RATs, is that the resource manager may exhaust the available resource of one RAT before considering the resource of another RAT. The resource manager may be the scheduler of the BS in the scenario of FIG. 6(B) with co-located multi-RATs.

The base stations then proceed to perform transmission/reception of packets with the UE according to the determined resource allocation (S16). As part of its communications with the base stations, the UE sends measurement reports (S18) as described further below.

Information Exchange Framework

There are several options at the network side to facilitate the information exchange among the base stations of different RATs.

In one option, a centralised node is connected, directly or indirectly, to each base station of different RATs, which co-ordinates the communication among the base stations.

In another option, when a UE is configured with multi-RAT multi-flow aggregation, one base station will be selected as a primary serving BS (e.g. an LTE eNB). In this scenario the resource manager may be provided by the primary serving BS. The primary serving BS has the direct communication with the core network nodes regarding radio bearer management and other management functions; and then forwards the information to other involved base stations via a logical interface.

In a third option, each base station directly communicates with core network nodes, where it is assumed that all core network nodes are inter-connected. In this option, the information exchange among base station is via the core network nodes. In this option, there may not be a single resource manager. The radio resource scheduling decisions can be based on the pre-configured or defined rules/policies agreed among the involved base stations.

Separation of Information Flows

In order to simplify system operation, control information (e.g. RRC signalling) may be restricted to one RAT. RRC signalling is UE dedicated signalling. As mentioned earlier, the LTE network may be in control, carrying all the control signalling for the UE. Similarly, physical layer signalling may also be restricted to one RAT.

Channels such as PDCCH and PUCCH in LTE carry physical layer control signals (e.g. indicating resource allocation), which are not visible to higher layers. By the way, RRC signalling is carried over PDCH and treated as data traffic from PHY's point of view.

Furthermore, uplink operation may be restricted to one RAT (i.e. additional RATs are employed for downlink only). This will often reflect service needs (e.g. Internet browsing or video streaming) and may be appropriate if the RATs have significantly different characteristics (e.g. QoS or coverage). Traffic requiring different QoS can be routed via different RATs.

As an example embodiment, referring again to the FIG. 6 scenario, full functionality is provided using LTE, while restricted functionality (e.g. DL only, and no RRC signalling) is provided by WiFi.

Channel Status Information Report/Indication

In this embodiment, the UEs that have been configured with multi-RAT multi-flow aggregation report the channel status information of all involved RATs. This needs to be configured or instructed by the network via, for example, RRC signalling in LTE. Different from the existing CSI reports, this new type of report contains CSI information for multiple RATs (both 3GPP RATs and non-3GPP RATs) and needs to be available to all involved base stations. This can be done through individual physical channels of each of the different RATs, or using only one RAT, and with information transfer between base stations. Thus, for example, CSI relating to one RAT can be carried by another RAT.

Alternatively, this can be done using an UL channel that is available for all base stations. This could be achieved by using, for example, a new carrier type, a common carrier at a frequency capable of being used by all RATs.

The content of the reports, instead of detailed information as specified in current 3GPP specs, can be simplified to coarse indications of the quality, availability and preference of different RATs from the UE's perspective. Here, "preference" is mainly intended to refer to the UE's preference of RAT for receiving downlink transmission. The UE's preference need not be exclusively, or even partly, based on signal quality, but could be based on economic considerations: for example use of Wi-Fi will normally be free whereas usage of LTE may incur charges.

The report can be periodic with a certain interval (configurable by the network), which allows the network to schedule the data transmission in semi-static manner. Event driven reports can also be configured in order for both network and terminal to quickly adapt to changes in network status. In this case, thresholds could be defined in order to reduce the signalling overhead.

FIG. 9 shows one possible format of such a CSI message. In this example CSI is signalled individually for each of three RATs within one combined CSI message. Each RAT is identified by an identification field such as "RAT1 ID" preceding the CSI for that RAT ("CSI for RAT1", etc.). By use of the identification fields, the receiving base station can determine which part of the message relates to the RAT(s) supported by that base station, and which parts of the message need to be routed to other base stations (assuming the CSI is sent over a single RAT to one base station). Of course, various forms are possible for such a message. Also, the receiving base station might simply forward the whole message rather than breaking it down into constituent parts.

Reports may be triggered by the UE, in which case a mechanism is needed for the UE to indicate that such a report is available or will be transmitted. As an example, an indication in the UE's SRS (Sounding Reference Signal) transmission can be defined to indicate that the report will be transmitted soon, e.g. in the next or the same subframe (this may be possible if a common carrier is used for all involved RATs.) This will further enhance the flexibility and efficiency of such a report. A UE-triggered report may be restricted to one or more RATs preferred by the UE; on the other hand periodic reports set by the network preferably cover all the available RATs.

Once the report is transmitted to the network, the UE will assume the preferred RAT (based on the policy/rule instructed from the network) is going to be used for the next data transmission, unless it is instructed otherwise by the network (i.e. the primary serving base station). By doing so, the existing channel status information reporting based on the existing standards will be performed accordingly for the specific serving RAT.

Various modifications are possible within the scope of the present invention.

The above description refers to a UE, but the invention is also applicable to other types of wireless device receiving data on a downlink of a multi-RAT system, for example a relay or picocell base station. In that case, the relay/picocell behaves as an UE towards a base station that controls the radio resources (a donor eNB in LTE terminology).

Also, although the description assumes that different base stations employ different RATs, it would be possible for some of the base stations to be using the same RAT but operated by different mobile operators (in other words in different RANs using the same RAT).

To summarise, embodiments of the present invention enable the co-ordination of multiple base stations of different RATs (e.g. LTE eNB, UMTS or WiMAX base station, WiFi access point, etc.) with the assistance of the terminals (UEs in 3GPP terminology) in order to achieve efficient radio resource scheduling for multi-RAT multi-flow aggregation in the downlink. At the network side, multi-RAT flows share the same PDCP Entity (either a common PDCP entity, or identical copies thereof), while each has independent RLC/MAC. At the terminal side, UE performs necessary measurements on all involved RATs, depending on the requirements of different RATs, and sends measurement reports/indications to all involved base stations. Based on the measurement report as well as pre-defined rules/policy, the decision will be made on which RAT should be used for next DL transmission or next period of DL transmission.

INDUSTRIAL APPLICABILITY

The invention enables efficient downlink radio resource scheduling for multi-RAT multi-flow aggregation in a mobile communication system where terminals are configured to transmit and receive data simultaneously using multiple base stations of different radio access technologies (RATs). This invention allows multi-RAT base stations to transmit simultaneously to a single UE thus improving data rates and the user experience across the entire coverage area, furthermore improving the overall system load balancing.

The invention claimed is:

1. A multi-RAT (radio access technologies) wireless communication system, comprising:
   a terminal;
   a first base station wirelessly communicating with the terminal via a first RAT; and
   a second base station wirelessly communicating with the terminal via a second RAT;
   the first and second RATs each having a Packet Data Control Protocol (PDCP) or equivalent layer as an upper protocol layer, and a Radio Link Control (RLC) or equivalent layer and a Media Access Control (MAC) or equivalent layer as lower protocol layers associated with the upper protocol layer;

the first and second base stations maintaining entities at each of a plurality of the protocol layers for configuring one or more radio bearers for wireless communication with the terminal; and wherein the one or more radio bearers are carried by both the first and second RATs, a radio bearer being configured in the first and second base stations with a same entity at the PDCP or equivalent layer for the first and second RATs, and with different entities at one of the Radio Link Control (RLC) or equivalent, and the Media Access Control (MAC) or equivalent, protocol layers for the first and second RATs.

2. The wireless communication system according to claim 1, wherein the first and second base stations are provided by a single multi-RAT base station in which are provided a single entity per terminal at the PDCP or equivalent layer for both RATs and one or more different entities per terminal at the RLC or equivalent layer or at the MAC or equivalent layer for each RAT.

3. The wireless communication system according to claim 1, wherein the first and second base stations comprise physically separated base stations, in each of which are provided a single entity at the PDCP or equivalent layer for both RATs and one or more different entities at the RLC or equivalent layer or at the MAC or equivalent layer for each RAT, correspondence between respective entities in each base station being maintained by mutual communication via a communications link between the base stations.

4. The wireless communication system according to claim 3, wherein there is a single radio bearer, one of the base stations is selected as a primary base station responsible for management of the single radio bearer and for forwarding information to another base station.

5. The wireless communication system according to claim 1, wherein the first and second base stations comprise physically separated base stations each connected via a communications link to a central node, and in each of the base stations there are provided a single entity at the PDCP or equivalent layer for both RATs and one or more different entities at the RLC or equivalent layer or at the MAC or equivalent layer for each RAT, correspondence between respective entities in each base station being maintained by control of the central node.

6. The wireless communication system according to claim 1, wherein the radio bearer is applicable to both a downlink and an uplink, entities being defined at the RLC or equivalent layer or at the MAC or equivalent layer in each RAT for each of the uplink and downlink.

7. The wireless communication system according to claim 1, wherein the one or more radio bearers include a data bearer for serving the terminal with a given quality of service.

8. The wireless communication system according to claim 1, wherein one of the first and second base stations configures an additional radio bearer as a signalling bearer carried by only one of the RATs.

9. The wireless communication system according to claim 1, wherein uplink communication from the terminal is carried by only one of the RATs.

10. The wireless communication system according to claim 1, wherein the terminal is arranged to perform a measurement on a wireless communications link in at least one RAT and to send a measurement report via the at least one RAT.

11. The wireless communication system according to claim 10, wherein the measurement report contains information for more than one RAT.

12. The wireless communication system according to claim 10, wherein the measurement report contains an indication of a RAT preferred by the terminal for wireless communication with the terminal.

13. A method of operating a wireless communication system comprising:

a first base station wirelessly communicating with a terminal via a first RAT (radio access technologies); and a second base station wirelessly communicating with the terminal via a second RAT;

providing the first and second RATs with Packet Data Control Protocol (PDCP) or equivalent layer as an upper protocol layer, and a Radio Link Control (RLC) or equivalent layer and a Media Access Control (MAC) or equivalent layer as lower protocol layers associated with the upper protocol layer;

maintaining, at the first and second base stations, entities at each of a plurality of the protocol layers for configuring one or more radio bearers for wireless communication with the terminal; and carrying the one or more radio bearers by both the first and second RATs, the first and second base stations configuring a radio bearer with a same entity at the PDCP or equivalent layer for the first and second RATs, and with different entities at the RLC or equivalent layer or at the MAC or equivalent layer for the first and second RATs.

14. Base station equipment for use in a multi-RAT (radio access technologies) wireless communication system and providing at least one of a first base station wirelessly communicating with a terminal via a first RAT and a second base station wirelessly communicating with the terminal via a second RAT, the first and second RATs each defining a PDCP or equivalent layer as an upper protocol layer, and a Radio Link Control (RLC) or equivalent layer and a Media Access Control (MAC) layer or equivalent layer as lower protocol layers associated with the upper protocol layer;

wherein said base station equipment is arranged to maintain entities at each of a plurality of the protocol layers for configuring one or more radio bearers to be carried by both the first and second RATs for wireless communication with the terminal; and the base station equipment being arranged to maintain a single entity per terminal at the PDCP or equivalent layer for the first and second RATs, and different entities per terminal at the RLC or equivalent layer or at the MAC or equivalent layer for the first and second RATs.

* * * * *